(12) United States Patent
Shainski et al.

(10) Patent No.: US 11,764,940 B2
(45) Date of Patent: Sep. 19, 2023

(54) SECURE SEARCH OF SECRET DATA IN A SEMI-TRUSTED ENVIRONMENT USING HOMOMORPHIC ENCRYPTION

(71) Applicant: Duality Technologies, Inc., Maplewood, NJ (US)

(72) Inventors: Arina Shainski, Ramat Hasharon (IL); Marcelo Blatt, Modiin (IL)

(73) Assignee: Duality Technologies, Inc., Maplewood, NJ (US)

( * ) Notice: Subject to any disclaimer, the term of this patent is extended or adjusted under 35 U.S.C. 154(b) by 148 days.

(21) Appl. No.: 16/739,313

(22) Filed: Jan. 10, 2020

(65) Prior Publication Data

US 2020/0228308 A1 Jul. 16, 2020

Related U.S. Application Data

(60) Provisional application No. 62/790,696, filed on Jan. 10, 2019.

(51) Int. Cl.
*H04L 29/06* (2006.01)
*H04L 9/00* (2022.01)
(Continued)

(52) U.S. Cl.
CPC .......... *H04L 9/008* (2013.01); *G06F 16/2455* (2019.01); *H04L 9/3247* (2013.01)

(58) Field of Classification Search
CPC . G06F 16/2455; G06F 21/6227; H04L 9/008; H04L 9/3247
See application file for complete search history.

(56) References Cited

U.S. PATENT DOCUMENTS 3,673,399 A  6/1972 Hancke
3,851,162 A  11/1974 Munoz
(Continued)

OTHER PUBLICATIONS

Ioannis, Daskalopoulous, "Dynamic Searchable Symmetric Encryption"; Thesis; University of Piraeus, Athens; (Year: 2015); http://dione.lib.unipi.gr/xmlui/bitstream/handle/unipi/8775/Daskalopoulos_Ioannis.pdf.
(Continued)

*Primary Examiner* — Joseph P Hirl
*Assistant Examiner* — Leynna Truvan
(74) *Attorney, Agent, or Firm* — PEARL COHEN ZEDEK LATZER BARATZ LLP (57) ABSTRACT

A system and method for secure searching in a semi-trusted environment by comparing first and second data (query and target data). A first data provider may map first secret data to a first plurality of tokens using a token codebook, concatenate the first plurality of tokens to generate a first token signature, and homomorphically encrypt the first token signature. A second data provider may map second data to a second plurality of tokens using the token codebook, concatenate the second plurality of tokens to generate a second token signature, and compare the homomorphically encrypted first token signature and an unencrypted or homomorphically encrypted second token signature to generate a homomorphically encrypted comparison. A trusted party may decrypt the homomorphically encrypted comparison, using a secret homomorphic decryption key, to determine if the token signatures match or not respectively indicating the search query is found or not in the target data.

20 Claims, 4 Drawing Sheets

(51) Int. Cl.
    *G06F 16/2455* (2019.01)
    *H04L 9/32* (2006.01)

(56) References Cited

U.S. PATENT DOCUMENTS

| | | | |
|---|---|---|---|
| 4,450,525 | A | 5/1984 | Demuth |
| 4,493,048 | A | 1/1985 | Kung |
| 4,689,762 | A | 8/1987 | Thibodeau, Jr. |
| 4,791,590 | A | 12/1988 | Ku |
| 4,896,287 | A | 1/1990 | O'Donnell |
| 4,949,294 | A | 8/1990 | Wambergue |
| 4,972,358 | A | 11/1990 | Welles, II |
| 5,177,691 | A | 1/1993 | Welles |
| 5,272,755 | A | 12/1993 | Miyaji |
| 5,317,639 | A | 5/1994 | Mittenthal |
| 5,377,207 | A | 12/1994 | Perlman |
| 5,627,863 | A | 5/1997 | Aslanis |
| 5,647,001 | A | 7/1997 | Mittenthal |
| 5,717,620 | A | 2/1998 | Williams |
| 5,831,883 | A | 11/1998 | Suter |
| 6,003,056 | A | 12/1999 | Auslander |
| 6,073,154 | A | 6/2000 | Dick |
| 6,081,821 | A | 6/2000 | Hopkinson |
| 6,098,088 | A | 8/2000 | He |
| 6,098,152 | A | 8/2000 | Mounes-Toussi |
| 6,128,764 | A | 10/2000 | Gottesman |
| 6,144,740 | A | 11/2000 | Laih |
| 6,167,392 | A | 12/2000 | Ostrovsky et al. |
| 6,240,143 | B1 | 5/2001 | Shanbhag |
| 6,263,436 | B1 | 7/2001 | Franklin |
| 6,308,295 | B1 | 10/2001 | Sridharan |
| 6,408,368 | B1 | 6/2002 | Parady |
| 6,438,554 | B1 | 8/2002 | Di-Crescenzo et al. |
| 6,477,554 | B1 | 11/2002 | Aizenberg |
| 6,549,925 | B1 | 4/2003 | Amrany |
| 6,721,349 | B1 | 4/2004 | Willenegger |
| 6,792,108 | B1 | 9/2004 | Patera |
| 6,801,579 | B1 | 10/2004 | Hassibi |
| 7,158,569 | B1 | 1/2007 | Penner |
| 7,966,359 | B2 | 6/2011 | Brenner |
| 8,291,237 | B2 | 10/2012 | Ostrovsky et al. |
| 8,533,489 | B2 | 9/2013 | Roeder |
| 8,619,980 | B2 | 12/2013 | Suzuki et al. |
| 8,903,083 | B2 | 12/2014 | Gentry et al. |
| 8,948,375 | B2 | 2/2015 | Burnett |
| 9,009,089 | B1 | 4/2015 | El Defrawy |
| 9,083,526 | B2 | 7/2015 | Gentry |
| 9,094,378 | B1 | 7/2015 | Yung et al. |
| 9,118,631 | B1 | 8/2015 | Yung et al. |
| 9,197,327 | B2 | 11/2015 | Geyer |
| 9,215,068 | B2 | 12/2015 | Iwamura et al. |
| 9,225,385 | B2 | 12/2015 | Keusgen |
| 9,281,941 | B2 | 3/2016 | Gentry et al. |
| 9,305,180 | B2 | 4/2016 | Cardno |
| 9,313,179 | B1 | 4/2016 | Yung et al. |
| 9,436,835 | B1 | 9/2016 | Saldamli |
| 9,438,412 | B2 | 9/2016 | Rane |
| 9,442,980 | B1 | 9/2016 | Trepetin et al. |
| 9,449,191 | B2 | 9/2016 | MacCarthy |
| 9,519,798 | B2 | 12/2016 | Egorov et al. |
| 9,608,817 | B2 | 3/2017 | Gentry et al. |
| 9,621,346 | B2 | 4/2017 | Gentry et al. |
| 9,680,653 | B1 | 6/2017 | Bradbury |
| 9,742,556 | B2 | 8/2017 | Bacon et al. |
| 9,742,566 | B2 | 8/2017 | Gentry et al. |
| 9,787,647 | B2 | 10/2017 | Wu |
| 9,794,068 | B2 | 10/2017 | Yasuda |
| 9,825,758 | B2 | 11/2017 | Feng |
| 9,892,211 | B2 | 2/2018 | Yoshino et al. |
| 9,894,042 | B2 | 2/2018 | Dawoud |
| 9,942,032 | B1 | 4/2018 | Kornaropoulos |
| 9,946,810 | B1 | 4/2018 | Trepetin et al. |
| 9,967,289 | B2 | 5/2018 | White |
| 9,971,907 | B2 | 5/2018 | Egorov et al. |
| 9,973,334 | B2 | 5/2018 | Hibshoosh |
| 10,019,709 | B2 | 7/2018 | Abbott |
| 10,057,057 | B2 | 8/2018 | Gentry et al. |
| 10,075,288 | B1 | 9/2018 | Khedr et al. |
| 10,097,522 | B2 | 10/2018 | Philipp et al. |
| 10,116,437 | B1 | 10/2018 | Krendelev |
| 10,176,207 | B1 | 1/2019 | Dawoud |
| 10,181,049 | B1 | 1/2019 | El Defrawy |
| 10,211,986 | B2 | 2/2019 | Isshiki |
| 10,255,464 | B2 | 4/2019 | Terra |
| 10,268,832 | B1 | 4/2019 | Ciubotariu |
| 10,296,709 | B2 | 5/2019 | Laine |
| 10,318,952 | B1 | 6/2019 | Wade |
| 10,333,695 | B2 | 6/2019 | Laine et al. |
| 10,333,715 | B2 | 6/2019 | Chu |
| 10,341,103 | B2 | 7/2019 | Shaked |
| 10,346,617 | B1 | 7/2019 | El Defrawy |
| 10,348,485 | B2 | 7/2019 | Stueve |
| 10,375,066 | B2 | 8/2019 | Chabanne |
| 10,380,389 | B1 | 8/2019 | Wade |
| 10,394,860 | B1 | 8/2019 | Zelenov et al. |
| 10,395,060 | B2 | 8/2019 | Setty |
| 10,402,816 | B2 | 9/2019 | Terra |
| 10,404,667 | B2 | 9/2019 | Iyer |
| 10,404,669 | B2 | 9/2019 | Dawoud |
| 10,417,442 | B2 | 9/2019 | Ohara |
| 10,438,189 | B2 | 10/2019 | Rezayee |
| 10,496,631 | B2 | 12/2019 | Tschudin |
| 10,505,711 | B2 | 12/2019 | Thiebeauld de La Crouee |
| 10,541,805 | B2 | 1/2020 | Laine et al. |
| 10,554,385 | B2 | 2/2020 | Gajek |
| 10,567,511 | B2 | 2/2020 | Schmidt |
| 10,587,563 | B2 | 3/2020 | Moffat |
| 10,599,874 | B2 | 3/2020 | Brady |
| 10,621,364 | B1 | 4/2020 | El Defrawy |
| 10,621,590 | B2 | 4/2020 | Rezayee |
| 10,644,876 | B2 | 5/2020 | Williams et al. |
| 10,673,614 | B2 | 6/2020 | Hirano |
| 10,790,961 | B2 | 9/2020 | Lin |
| 10,812,252 | B2 | 10/2020 | Laine |
| 10,831,903 | B2 | 11/2020 | Li |
| 10,917,235 | B2 | 2/2021 | Gama |
| 2001/0009030 | A1 | 7/2001 | Piret |
| 2001/0019630 | A1 | 9/2001 | Johnson |
| 2001/0034640 | A1 | 10/2001 | Chaum |
| 2002/0009197 | A1 | 1/2002 | Keyes |
| 2002/0027986 | A1 | 3/2002 | Brekne |
| 2002/0049601 | A1 | 4/2002 | Asokan |
| 2002/0114452 | A1 | 8/2002 | Hamilton |
| 2002/0178194 | A1 | 11/2002 | Aizenberg |
| 2003/0021365 | A1 | 1/2003 | Min |
| 2003/0065632 | A1 | 4/2003 | Hubey |
| 2003/0081785 | A1 | 5/2003 | Boneh |
| 2003/0182554 | A1 | 9/2003 | Gentry |
| 2004/0105546 | A1 | 6/2004 | Chernyak |
| 2004/0151307 | A1 | 8/2004 | Wang |
| 2004/0156498 | A1 | 8/2004 | Paeng |
| 2004/0179622 | A1 | 9/2004 | Calabro |
| 2004/0205036 | A1 | 10/2004 | Prabhu |
| 2004/0223616 | A1 | 11/2004 | Kocarev |
| 2005/0055546 | A1 | 3/2005 | Dzung |
| 2005/0094806 | A1 | 5/2005 | Jao |
| 2005/0138516 | A1 | 6/2005 | Yedidia |
| 2005/0246533 | A1 | 11/2005 | Gentry |
| 2006/0075010 | A1 | 4/2006 | Wadleigh |
| 2006/0098814 | A1 | 5/2006 | Al-Khoraidly |
| 2006/0129800 | A1 | 6/2006 | Lauter |
| 2006/0140401 | A1 | 6/2006 | Johnson |
| 2006/0177051 | A1 | 8/2006 | Lauter |
| 2006/0206554 | A1 | 9/2006 | Lauter |
| 2006/0286587 | A1 | 12/2006 | Lee |
| 2007/0088774 | A1 | 4/2007 | Li |
| 2007/0095909 | A1 | 5/2007 | Chaum |
| 2007/0106718 | A1 | 5/2007 | Shum |
| 2007/0162373 | A1 | 7/2007 | Kongtcheu |
| 2007/0165843 | A1 | 7/2007 | Lauter |
| 2007/0271326 | A1 | 11/2007 | Li |
| 2007/0294183 | A1 | 12/2007 | Camenisch |
| 2008/0036760 | A1 | 2/2008 | Smith |
| 2008/0063110 | A1 | 3/2008 | Averbuch |

(56) References Cited

U.S. PATENT DOCUMENTS

| | | |
|---|---|---|
| 2008/0140750 A1 | 6/2008 | Kershaw |
| 2008/0201394 A1 | 8/2008 | Li |
| 2008/0208560 A1 | 8/2008 | Johnson |
| 2008/0263285 A1 | 10/2008 | Sharma |
| 2008/0298582 A1 | 12/2008 | Sakai |
| 2009/0010428 A1 | 1/2009 | Delgosha |
| 2009/0106633 A1 | 4/2009 | Fujiwara |
| 2009/0112955 A1 | 4/2009 | Kershaw |
| 2009/0135717 A1 | 5/2009 | Kamal |
| 2009/0160576 A1 | 6/2009 | Dent |
| 2009/0249162 A1 | 10/2009 | Tjhai |
| 2009/0285332 A1 | 11/2009 | Damen |
| 2009/0307218 A1 | 12/2009 | Selly |
| 2009/0327255 A1 | 12/2009 | Larson |
| 2010/0002872 A1 | 1/2010 | Shibutani |
| 2010/0111296 A1 | 5/2010 | Brown |
| 2010/0131807 A1 | 5/2010 | Truong |
| 2010/0146299 A1 | 6/2010 | Swaminathan |
| 2010/0169346 A1 | 7/2010 | Boldyrev |
| 2010/0251378 A1 | 9/2010 | Eker |
| 2010/0332942 A1 | 12/2010 | Wezelenburg |
| 2011/0013716 A1 | 1/2011 | Brodzik |
| 2011/0107201 A1 | 5/2011 | Kim |
| 2011/0125439 A1 | 5/2011 | Guruprasad |
| 2012/0030468 A1 | 2/2012 | Papamanthou |
| 2012/0039463 A1 | 2/2012 | Gentry et al. |
| 2012/0039465 A1 | 2/2012 | Gentry et al. |
| 2012/0039469 A1 | 2/2012 | Mueller |
| 2012/0096328 A1 | 4/2012 | Franceschini |
| 2012/0120074 A1 | 5/2012 | Huysmans |
| 2012/0163584 A1 | 6/2012 | Adjedj |
| 2012/0198560 A1 | 8/2012 | Fiske |
| 2013/0010950 A1 | 1/2013 | Kerschbaum |
| 2013/0019139 A1 | 1/2013 | Panteleev |
| 2013/0097431 A1 | 4/2013 | Hriljac |
| 2013/0099874 A1 | 4/2013 | Bromberger |
| 2013/0158918 A1 | 6/2013 | Spanier |
| 2013/0170640 A1 | 7/2013 | Gentry |
| 2013/0216044 A1 | 8/2013 | Gentry et al. |
| 2013/0262863 A1 | 10/2013 | Yoshino et al. |
| 2013/0318360 A1 | 11/2013 | Yamamoto |
| 2013/0326315 A1 | 12/2013 | Elia |
| 2013/0329883 A1 | 12/2013 | Tamayo-Rios |
| 2013/0346755 A1 | 12/2013 | Nguyen |
| 2014/0064407 A1 | 3/2014 | Dandach |
| 2014/0105403 A1 | 4/2014 | Baldi |
| 2014/0237253 A1 | 8/2014 | Joye |
| 2014/0280427 A1 | 9/2014 | Bocharov et al. |
| 2014/0283040 A1 | 9/2014 | Wilkerson |
| 2014/0355756 A1 | 12/2014 | Iwamura et al. |
| 2014/0379726 A1 | 12/2014 | Roger |
| 2015/0033025 A1 | 1/2015 | Hoffstein |
| 2015/0039912 A1 | 2/2015 | Payton |
| 2015/0055688 A1 | 2/2015 | Xiong |
| 2015/0067874 A1 | 3/2015 | Johnson |
| 2015/0092872 A1 | 4/2015 | Keusgen |
| 2015/0095747 A1 | 4/2015 | Tamo |
| 2015/0106418 A1 | 4/2015 | Kliuchnikov |
| 2015/0128290 A1 | 5/2015 | De Ayala |
| 2015/0143509 A1 | 5/2015 | Selander |
| 2015/0154147 A1 | 6/2015 | Alboszta |
| 2015/0180667 A1 | 6/2015 | Bringer |
| 2015/0280906 A1 | 10/2015 | Shany |
| 2015/0312031 A1 | 10/2015 | Seo |
| 2015/0318865 A1 | 11/2015 | Rotge |
| 2015/0333905 A1 | 11/2015 | Parann-Nissany |
| 2015/0358153 A1 | 12/2015 | Gentry |
| 2015/0365239 A1 | 12/2015 | Gajek et al. |
| 2015/0378734 A1 | 12/2015 | Hansen |
| 2016/0004965 A1 | 1/2016 | Liebig |
| 2016/0070673 A1 | 3/2016 | Wang |
| 2016/0105402 A1 | 4/2016 | Soon-Shiong |
| 2016/0164670 A1 | 6/2016 | Gentry et al. |
| 2016/0164671 A1 | 6/2016 | Gentry et al. |
| 2016/0164676 A1 | 6/2016 | Gentry et al. |
| 2016/0173124 A1 | 6/2016 | Majumdar |
| 2016/0180238 A1 | 6/2016 | Alboszta |
| 2016/0180241 A1 | 6/2016 | Alboszta |
| 2016/0189053 A1 | 6/2016 | Alboszta |
| 2016/0210560 A1 | 7/2016 | Alboszta |
| 2016/0232362 A1 | 8/2016 | Conway |
| 2016/0239463 A1 | 8/2016 | Song |
| 2016/0283600 A1* | 9/2016 | Ackerly ................ H04L 63/04 |
| 2016/0328253 A1 | 11/2016 | Majumdar |
| 2016/0330017 A1 | 11/2016 | Youn |
| 2016/0335450 A1 | 11/2016 | Yoshino et al. |
| 2016/0344707 A1 | 11/2016 | Philipp et al. |
| 2016/0357799 A1 | 12/2016 | Choi |
| 2016/0372128 A1 | 12/2016 | Baeckstroem |
| 2017/0024585 A1 | 1/2017 | Mooij |
| 2017/0063525 A1 | 3/2017 | Bacon et al. |
| 2017/0109537 A1 | 4/2017 | Patzer |
| 2017/0116410 A1 | 4/2017 | Wajs |
| 2017/0134157 A1 | 5/2017 | Laine |
| 2017/0134158 A1 | 5/2017 | Pasol |
| 2017/0147835 A1 | 5/2017 | Bacon et al. |
| 2017/0149796 A1 | 5/2017 | Gvili |
| 2017/0155628 A1 | 6/2017 | Rohloff et al. |
| 2017/0228448 A1 | 8/2017 | Fan |
| 2017/0242961 A1 | 8/2017 | Shukla et al. |
| 2017/0249460 A1 | 8/2017 | Lipton |
| 2017/0250796 A1 | 8/2017 | Samid |
| 2017/0300372 A1 | 10/2017 | Andreopoulos |
| 2017/0324556 A1 | 11/2017 | Brown |
| 2018/0011996 A1 | 1/2018 | Dolev et al. |
| 2018/0034482 A1 | 2/2018 | Wu |
| 2018/0034626 A1 | 2/2018 | Yamada |
| 2018/0053112 A1 | 2/2018 | Bravyi |
| 2018/0060604 A1 | 3/2018 | Bent |
| 2018/0083732 A1 | 3/2018 | Rekaya-Ben Othman |
| 2018/0091306 A1 | 3/2018 | Antonopoulos |
| 2018/0109376 A1 | 4/2018 | Gentry et al. |
| 2018/0117447 A1* | 5/2018 | Tran ................ G16H 10/60 |
| 2018/0123849 A1 | 5/2018 | Si |
| 2018/0131506 A1 | 5/2018 | Laine et al. |
| 2018/0183571 A1 | 6/2018 | Gajek |
| 2018/0198601 A1 | 7/2018 | Laine et al. |
| 2018/0198613 A1 | 7/2018 | Anderson |
| 2018/0212750 A1 | 7/2018 | Hoffstein et al. |
| 2018/0212753 A1 | 7/2018 | Williams |
| 2018/0212775 A1 | 7/2018 | Williams |
| 2018/0212933 A1 | 7/2018 | Williams |
| 2018/0254893 A1 | 9/2018 | Saxena |
| 2018/0267981 A1 | 9/2018 | Sirdey |
| 2018/0278410 A1 | 9/2018 | Hirano |
| 2018/0300497 A1 | 10/2018 | Carpov |
| 2018/0323805 A1 | 11/2018 | Li |
| 2018/0337788 A1 | 11/2018 | Gajek et al. |
| 2018/0349577 A1 | 12/2018 | Goldwasser et al. |
| 2018/0357434 A1 | 12/2018 | Radhika |
| 2018/0357530 A1 | 12/2018 | Beery |
| 2018/0359078 A1 | 12/2018 | Jain |
| 2018/0359084 A1 | 12/2018 | Jain |
| 2018/0367293 A1 | 12/2018 | Chen |
| 2018/0373672 A1 | 12/2018 | Marin |
| 2019/0007196 A1 | 1/2019 | Malluhi et al. |
| 2019/0007197 A1 | 1/2019 | Laine |
| 2019/0036678 A1 | 1/2019 | Ahmed |
| 2019/0052412 A1 | 2/2019 | Lopez |
| 2019/0058622 A1 | 2/2019 | Bouttier |
| 2019/0080254 A1 | 3/2019 | Haah |
| 2019/0080392 A1 | 3/2019 | Youb |
| 2019/0109712 A1 | 4/2019 | Blass |
| 2019/0114228 A1 | 4/2019 | Twitto |
| 2019/0141051 A1 | 5/2019 | Ikarashi |
| 2019/0158119 A1 | 5/2019 | Shany |
| 2019/0205773 A1 | 7/2019 | Ackerman |
| 2019/0229972 A1 | 7/2019 | Kohda |
| 2019/0251262 A1 | 8/2019 | Fiske |
| 2019/0303511 A1 | 10/2019 | McKemey |
| 2019/0334694 A1 | 10/2019 | Chen |
| 2019/0347162 A1 | 11/2019 | Moussa |
| 2019/0363871 A1 | 11/2019 | Cheon |
| 2019/0372754 A1 | 12/2019 | Gou |

(56) References Cited

U.S. PATENT DOCUMENTS

| | | |
|---|---|---|
| 2019/0385057 A1 | 12/2019 | Litichever |
| 2019/0386814 A1 | 12/2019 | Ahmed |
| 2020/0005173 A1 | 1/2020 | del Pino |
| 2020/0034347 A1 | 1/2020 | Selly |
| 2020/0044837 A1 | 2/2020 | Bos |
| 2020/0050959 A1 | 2/2020 | Ashrafi |
| 2020/0097256 A1 | 3/2020 | Marin |
| 2020/0111022 A1 | 4/2020 | Silberman |
| 2020/0112322 A1 | 4/2020 | Galbraith |
| 2020/0118026 A1 | 4/2020 | Ashrafi |
| 2020/0134199 A1 | 4/2020 | Conway |
| 2020/0143075 A1 | 5/2020 | Piatek |
| 2020/0151356 A1 | 5/2020 | Rohloff et al. |
| 2020/0177428 A1 | 6/2020 | Si |
| 2020/0322124 A1 | 10/2020 | Isshiki |

OTHER PUBLICATIONS

Williams_1_Provisional Application Combined; Jan. 2017 (Year: 2017).

Conway_Non-Provisional_Application: Feb. 2016 (Year: 2016).

\* cited by examiner

SECURE SEARCH OF SECRET DATA IN A SEMI-TRUSTED ENVIRONMENT USING HOMOMORPHIC ENCRYPTION

CROSS-REFERENCE TO RELATED APPLICATIONS

This application claims the benefit of U.S. Provisional Application Ser. No. 62/790,696, filed Jan. 10, 2019, which is hereby incorporated by reference in its entirety.

FIELD OF THE INVENTION

Embodiments of the invention are directed to data privacy, security, and encryption of secret data. Embodiments of the invention include systems and methods to encrypt secret data to safely share them with an external or third party, which can then execute queries, searches, or other computations, only on the encrypted secure data, without decrypting and exposing the underlying secret data. In particular embodiments of the invention are directed to fast and efficient searching of homomorphically encrypted ("HE") secret data.

BACKGROUND OF THE INVENTION

Today, massive amounts of data live in many organizations, with barriers between them, erected by mistrust, economic incentives and regulatory hurdles. When secret data, such as, personal, medical, or financial data, is involved, privacy becomes a major concern for all parties involved, as that information can be used to identify or exploit the individuals.

To encourage collaboration, while still protecting data secrecy, cryptosystems have been developed that allow parties to operate on encrypted data (i.e., ciphertexts) in an encrypted domain:

Fully Homomorphic Encryption (FHE) cryptosystems allow a third party to evaluate any computation on encrypted data without learning anything about it, such that only the legitimate recipient of the homomorphic calculation will be able to decrypt it using the recipient's secret key. Although FHE can theoretically work on any data, practically, FHE is too computationally burdensome and unrealistic to use in most real-world settings, especially when large amounts of data and complex computations are involved.

Functional Encryption (FE) cryptosystems allow authorized third parties who cannot decrypt, to evaluate selective authorized computations on encrypted data, without decrypting first. Such authorized third parties receive a different secret key for each computation, which enables the calculation of the computation on the data without decryption. In secret-key functional encryption schemes, both decryption and encryption require knowing a secret-key. In public-key functional encryption, decryption requires knowing a secret key, whereas encryption can be performed without knowing a secret-key and does not compromise security.

Proxy re-encryption (PRE) cryptosystems transform data encrypted in one key to data encrypted in another key. PRE may be used in settings involving two or more parties each holding a secret key to a different encryption scheme, and for classical encryption schemes.

However, these cryptosystems are often inefficient, adding extra layers of computations. Further, because the data being operated on is encrypted, it is difficult to find and target specific data. Current operations to search for specific data are often performed across an entire encrypted data set, which becomes prohibitively inefficient, especially when the datasets are large.

Accordingly, there is a need in the art for a fast and efficient technique to search for and target specific data within a ciphertext in the encrypted domain. There is also a need to be able to perform fast and efficient secret searches, such as financial fraud or other types of criminal investigations, in the encrypted domain, on cleartext or ciphertext, which does not compromise the secret search.

SUMMARY OF THE INVENTION

To overcome the aforementioned limitations inherent in the art, embodiments of the invention may provide a fast and efficient targeted search in the encrypted domain, where at least one, or both, of the search query and the targeted data are homomorphically encrypted.

In an embodiment of the invention, a system and method is provided for securely searching data in a semi-trusted environment by comparing first and second data. The first data element may be the search query and the second data element the target data to be searched, or the second data element may be the search query and the first data element the target data to be searched. A first data provider comprising one or more first processors may be configured to map a first data element comprising secret data to a first plurality of tokens using a codebook of tokens to represent data elements, concatenate the first plurality of tokens to generate a first token signature comprising the first plurality of tokens that uniquely represents the first data element, and homomorphically encrypt the first token signature using a public homomorphic encryption key to generate a homomorphically encrypted first token signature representing the first data element. A second data provider comprising one or more second processors may be configured to map a second data element to a second plurality of tokens using the token codebook, wherein one of the first and second data elements is a search query and the other is target data being searched, concatenate the second plurality of tokens to generate a second token signature comprising the second plurality of tokens that uniquely represent the second data element, and compare the homomorphically encrypted first token signature representing the first data element and an unencrypted or homomorphically encrypted second token signature to generate a homomorphically encrypted comparison of the first and second token signatures. The comparison of the first and second token signatures may be a binary indication of whether or not the search query is found in the target data, or a matching score indicating a frequency or certainty with which the search query is found in the target data. A trusted party comprising one or more processors may be configured to decrypt the homomorphically encrypted comparison, using a private homomorphic decryption key, to determine if the first and second token signatures match or not respectively indicating that the search query is found or not in the target data. The first data provider may operate in a trusted environment, the second data provider may operate in a trusted or semi-trusted environment, and the trusted party may operate in a trusted environment. The trusted party may be the first data provider, the second data provider, or a distinct third party system.

In an embodiment of the invention, the first and second data elements may be mapped to tokens by dividing the data element into one or more atomic data units, searching the codebook for a plurality of tokens matching each instance of each atomic data unit, and generating an ordered set of the plurality of tokens for the plurality of atomic units. The codebook of tokens may be dynamically updated by adding new tokens to the codebook and deleting preexisting tokens from the codebook, wherein the updated codebook is simultaneously available to both the first and second data providers.

In an embodiment of the invention, a first data provider is provided for securely searching data in a semi-trusted environment. The first data provider may comprise one or more memories configured to store a first data element comprising secret data, a codebook of tokens to represent data elements, and a public homomorphic encryption key. The first data provider may comprise one or more processors configured to map the first data element comprising secret data to a first plurality of tokens using the token codebook, concatenate the first plurality of tokens to generate a first token signature comprising the first plurality of tokens that uniquely represents the first data element, homomorphically encrypt the first token signature using the public homomorphic encryption key to generate a homomorphically encrypted first token signature representing the first data element, transmit the homomorphically encrypted first token signature to a second data provider to compare the homomorphically encrypted first token signature representing the first data element and an unencrypted or homomorphically encrypted second token signature representing a second data element and generate a homomorphically encrypted comparison of the first and second token signatures, wherein one of the first and second data elements is a search query and the other is target data being searched, and receive the result of decrypting the homomorphically encrypted comparison at a trusted device, using a private homomorphic decryption key, to determine if the first and second token signatures match or not respectively indicating that the search query is found or not in the target data.

In an embodiment of the invention, a second data provider is provided for securely searching data in a semi-trusted environment. The second data provider may comprise one or more memories configured to store a second data element, and a codebook of tokens to represent data elements. The one or more memories may be further configured to store the public homomorphic encryption key when the second data provider generates the homomorphically encrypted second token signature. The second data provider may comprise one or more processors configured to map the second data element to a second plurality of tokens using the token codebook, concatenate the second plurality of tokens to generate a second token signature comprising the second plurality of tokens that uniquely represent the second data element, receive, from a first data provider, a homomorphically encrypted first token signature that is a homomorphically encryption of a concatenation of a first plurality of tokens uniquely representing a first data element comprising secret data according to the codebook of tokens, wherein one of the first and second data elements is a search query and the other is target data being searched, compare the homomorphically encrypted first token signature representing the first data element and an unencrypted or homomorphically encrypted second token signature to generate a homomorphically encrypted comparison of the first and second token signatures, and transmit the homomorphically encrypted comparison to a trusted device to decrypt the homomorphically encrypted comparison, using a private homomorphic decryption key, to determine if the first and second token signatures match or not respectively indicating that the search query is found or not in the target data.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Embodiments of the invention enable fast and efficient targeted searches, in the homomorphic encryption encrypted domain, where the search query (e.g., search keywords) and/or target data being searched (e.g., database, document, image, video, or any other type of file or data repository, or metadata thereof) are homomorphically encrypted.

By utilizing homomorphic encryption, ciphertext can be compared to ciphertext, or ciphertext can be compared to plaintext, such that, a data provider or query provider may be able to compare (1) a homomorphically encrypted search query and homomorphically encrypted target data being searched; (2) a homomorphically encrypted search query and unencrypted target data being searched; or (3) an unencrypted search query and a homomorphically encrypted target data being searched. As long as at least one of the search query or target data are homomorphically encrypted, the comparison therebetween in all three scenarios are performed under homomorphic encryption, without exposing the underlying search query or target data being searched, i.e., in the homomorphic encryption domain. This is because homomorphic encryption provides an injective or one-to-one (1:1) mapping between operations on plaintext and operations on ciphertext. Accordingly, a search that is a comparison between the query and target data, performed between a homomorphically encrypted ciphertext and a plaintext (or between two ciphertexts), generates a homomorphically encrypted comparison. It is therefore secure to search by comparing two terms where at least one is homomorphically encrypted in a semi-trusted domain because neither the underlying homomorphically encrypted term(s) or homomorphically encrypted comparison can be decrypted or exposed without the associated secret homomorphic decryption key. The secret homomorphic decryption key is only stored or accessible to a trusted party.

When used herein, the term trusted may refer for example to an entity or system which is sufficiently trusted to correctly perform computations or operations such as a search (e.g., a comparison between a search query and target data to be searched), and also trusted to keep private data secret. When used herein, the term semi-trusted may refer for example to an entity or system which is sufficiently trusted to correctly perform computations or operations such as a search (e.g., a comparison between a search query and target data to be searched), but not trusted to access or keep private data secret. When used herein, the term untrusted may refer for example to an entity or system which is not sufficiently trusted to correctly perform computations or operations such as a search (e.g., a comparison between a search query and target data to be searched), and not trusted to access or keep private data secret.

The homomorphically encrypted search result or comparison may then be transmitted to a secure environment, e.g., the query provider, the data provider, or a third party, which securely stores the private homomorphic decryption key, to decrypt and analyze the results of the comparison, e.g., to determine if the search comparison renders a match or not.

Scenarios (1)-(3) above may be applied depending on the application, for example, depending on the secrecy or security level of the data (e.g., queries and/or target data with sensitive or proprietary information are generally encrypted, while data that is less or not sensitive such as public data is generally not encrypted), whether the devices, parties or environments storing the data are trusted, semi-trusted, or untrusted (e.g., data is generally encrypted in untrusted and semi-trusted environments and unencrypted in trusted environments), whether the communication channel is trusted to be secret, and/or whether the computation is likely to be compromised in the future.

Figure 1:
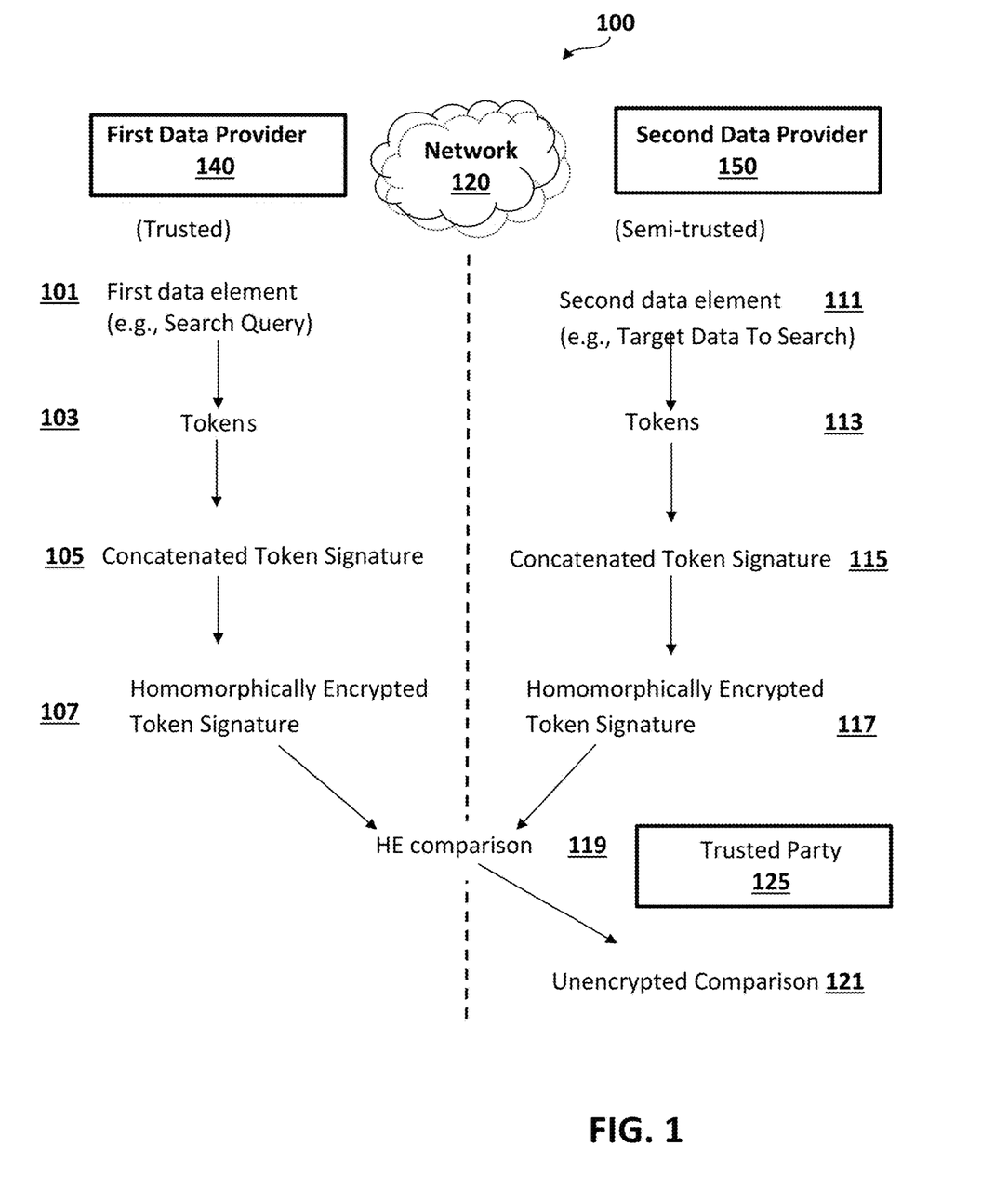
FIG. 1 is a schematic illustration of a multi-party system and workflow for performing a fast and secure targeted search in a semi-trusted environment using homomorphic encryption, according to an embodiment of the invention.

Examples of the search comparison in the aforementioned three scenarios (1)-(3) are:

In scenario (1), in which both the query and the target data being searched are homomorphically encrypted, e.g., as shown in FIG. 1, the homomorphically encrypted comparison may be a difference of a value of a query, value$_1$, plus noise generated from homomorphically encrypting the query, noise$_1$, and of a value of the target data being searched, value$_2$, plus noise generated from homomorphically encrypting the target data, noise$_2$, for example as:

$$\text{HEC}=(\text{value}_1+\text{noise}_1)-(\text{value}_2+\text{noise}_2) \qquad \text{EQN. 1A}$$

Because homomorphically encryption provides a 1:1 mapping between operations on plaintext and operations on ciphertext, the homomorphically encrypted comparison may be equivalently re-written as:

$$\text{HEC}=(\text{value}_1-\text{value}_2)+(\text{noise}_1-\text{noise}_2) \qquad \text{EQN. 1B}$$

In scenario (2), in which the query is homomorphically encrypted, but the target data being searched is not homomorphically encrypted, the homomorphically encrypted comparison may be a difference of a value of a query, value$_1$, plus noise generated from homomorphically encrypting the query, noise$_1$, and of a value of the target data being searched, value$_2$, for example as.

$$\text{HEC}=(\text{value}_1+\text{noise}_1)-(\text{value}_2) \qquad \text{EQN. 2A}$$

The homomorphically encrypted comparison may be equivalently re-written as:

$$\text{HEC}=(\text{value}_1-\text{value}_2)+(\text{noise}_1) \qquad \text{EQN. 2B}$$

In scenario (3), in which the query is unencrypted but the target data being searched are homomorphically encrypted, the homomorphically encrypted comparison may be a difference of a value of a query, value$_1$, and of a value of the target data being searched, value$_2$, plus noise generated from homomorphically encrypting the target data being searched, noise$_2$.

$$\text{HEC}=(\text{value}_1)-(\text{value}_2+\text{noise}_2) \qquad \text{EQN. 3A}$$

The homomorphically encrypted comparison may be equivalently re-written as:

$$\text{HEC}=(\text{value}_1-\text{value}_2)+(\text{noise}_2) \qquad \text{EQN. 3B}$$

The homomorphically encrypted comparison in each of the above equations 1B, 2B, and 3B, is a search result that is a comparison or difference between the query and target data (value$_1$-value$_2$) where 0 indicates a match (value$_1$-value$_2$=0, or equivalently, value$_1$=value$_2$) and a nonzero difference indicates no match (value$_1$-value$_2$≠0, or equivalently, value$_1$*value$_2$), as well as homomorphic encryption (noise$_1$ and/or noise$_2$). Because each comparison is homomorphically encrypted, the comparison appears as a ciphertext, or random string, that is impossible or impractical for an unverified observer to decipher or learn anything from the homomorphically encrypted comparison without the private homomorphic decryption key.

The homomorphically encrypted comparison may be defined by a binary indicator of whether or not the query matches the target data for any of the keywords/concatenations of keywords or not, as above, or may be defined by a more sophisticated "matching score" based on the frequency or certainty of the matching words/concatenations of key words in the document in the target data being searched. A matching score may enable the system to order the relevance of the target data being searched based on the matching score, e.g., sequentially listed in descending order form highest to lowest matching score.

Decrypting the homomorphically encrypted comparison with the private homomorphic decryption key removes the noise generated from the homomorphically encrypted comparison (e.g., noise$_1$ from homomorphically encrypting the query and/or noise$_2$ from homomorphically encrypting the target data being searched) to get an unencrypted search result, which may be a difference of a value of the search query and a value of the target data being searched:

$$\text{UR}=\text{value}_1-\text{value}_2 \qquad \text{EQN. 4}$$

where UR is the unencrypted result of the homomorphically encrypted comparison of each of EQNs. 1-3 in scenarios (1)-(3), respectively.

The homomorphically encrypted comparison may also be defined by other equations, for example, derived from, depending on, or permuting the terms in equations 1-3. For example, instead of the difference (value$_1$-value$_2$) where 0 indicates a match and a nonzero difference indicates no match, a ratio (value$_1$/value$_2$) may be used where a 1 indicates a match and any other ratio indicates no match, or a sum (value$_1$+value$_2$) where 2×query (when the query is known) indicates a match and any other sum indicates no match.

Scenarios (2) and (3), where one of the data elements (e.g., the search query or the target data being searched) is unencrypted, may be executed faster and with less computations than scenario (1) where both data elements are homomorphically encrypted, while providing the same benefit of secrecy by encrypting the search result.

In all scenarios (1)-(3), further optimization may be implemented using token-based searching to speed up computations in the homomorphic encryption domain which is typically slow and cumbersome in real-world settings, especially when large amounts of data are involved. The search environment may be optimized by using a codebook to create the token-based system that allows fast and efficient searching in the homomorphic encryption domain. Embodiments of the invention may tokenize the search query and each of a plurality of data entries or units of the target data being searched to create a token-signature for each data element. In some embodiments, the token-signature may be a concatenated string of a plurality of tokens representing a plurality of respective data, properties, parameters, or characteristics of each data element. Each concatenated token-signature is a concise manner of combining all or multiple aspects of each data element to avoid redundant searches for duplicative or similar terms. This may simplify and reduce the number of independent searches that need to be performed in the homomorphic encryption domain. For example, instead of running multiple independent searches of an address for boulevard and similar terms road and street, embodiments of the invention concatenate tokens for boulevard, road, and street into a single token-signature which requires a single HE comparison.

In order to achieve the goal of fast and efficient targeted searches, in the encrypted domain, the data elements may be initially processed to generate normalized data entries or units of the target data being searched by tokenizing a data element, such as a search query or target data being searched, by splitting it into a sequence of tokens. For example, information in the data element, such as words, numbers, or pixel values, may be mapped to tokens based on a codebook of tokens. The target data being searched may be a file to be searched itself, such as documents, images, or videos, or may refer to data located within such files, such as a field, column, or row within a document, or may be metadata of any of these data.

The data elements may be transformed into a set of tokens, for example as follows. Initially, the original data elements may be used or transformed into corresponding meta-data elements representing information extracted from the data element using rule-based or machine learning classification. Data processing standardizes the data elements, e.g., removing all common separators, operators, punctuations and non-printable characters and stemming and/or lemmatization to obtain the stem of a word that is a morphological root by removing the suffixes that present grammatical or lexical information about the word. The data elements may then be divided into one or more discrete atomic data units, such as, a number, a phoneme, discrete data blocks (e.g., a row of a table, or a pixel block of an image), etc. For example, an address, 11 Allen Street, may be broken down to the atomic data units of "eleven," "allen," and "street." The codebook of tokens may be searched for a plurality of tokens matching each instance of each atomic data unit, such as a token representing something with the same meaning or representing a synonym. An instance may be a token mapped to the same or similar meaning as the atomic data unit. For example, instances of tokens in the token book having the same meaning as the number "11" in "11 Allen Street", may be mapped to the numbers "11", the word "eleven", and the meaning "address number." An ordered set of the plurality of tokens for the plurality of atomic units may be generated based on the predefined token numbering e.g., in the codebook. In some embodiments, one or more processors of all data providers utilizing the system may be configured to order the plurality of tokens in a set way, such that an ordered list generated by either data provider for the same atomic unit have the same order. Alternatively, the lists may not be ordered in a specific way and, instead, all permutations of the ordering of the tokens in the list may be searched.

Using the codebook of tokens to map multiple different representations of the same or substantially similar information to a single token may reduce the number of comparisons needed to search. For example, "street", "st.", and "str.", which all refer to the word "street" may be mapped to the same token, reducing the number of independent HE comparisons by a factor of three. Because homomorphic encryption requires multiple computations per comparison, reducing the number of HE comparisons provides a speedup that is superliner to the factor by which the number of comparisons are reduced (e.g., more than a three-fold speed-up in the above comparison).

The use of the codebook of tokens allows embodiments of the invention to incorporate new tokens as they are created, creating a dynamic codebook that evolves as new data elements are added or preexisting data elements are deleted. For example, when a new data element is incorporated to the system and the data element contains a new word that is not already mapped to a token in the codebook, a new token and/or a new mapping to preexisting tokens may be created to map that new word to multiple relevant tokens in the codebook. Similarly, when words or data elements are deleted, one or more preexisting related tokens and/or their associated mappings may be deleted. The updated codebook should be simultaneously available to both the first and second data providers, so that both generate the same token string for the same data elements. When codebooks are locally stored at the data providers, a new updated codebook or only the changes with respect to the last version may be transmitted and/or locally stored by the first and second data providers. When codebooks are remotely stored, both data providers may access the same copy or two copies may be simultaneously updated. Accordingly, each data provider may have access to the same or an identical version of the codebook so that, for example, the same data elements are mapped to the same token string. In other words, this ensures that the same data element is not mapped to a different token string by using different data providers' token codebooks.

The codebook of tokens may also or alternatively be created and updated using publicly available information outside of the database being searched, such as one of the standard dictionaries for any language (e.g., Webster dictionary for English), a list of standard names, a list of phone numbers from a phonebook, and/or a list of street names, counties, states, and/or countries, and updated as new words, names, or numeric identifiers are found in data entries. Embodiments of the invention may utilize dictionaries, lists of abbreviations, and other information to determine words that have the same meaning and that should be mapped to the same token. In some embodiments of the invention, machine learning is utilized to create and update the codebook of tokens.

Embodiments of the invention may further speed up processing by reducing the number of comparisons in the homomorphic encryption domain by generating token signatures that are a concatenated string of a plurality of tokens that uniquely represent all tokens in the codebook associated with each data element, such as a query or target data being searched. Comparison of a single concatenated string of tokens thus replaces multiple distinct individual comparisons of each individual token in the string. For example, an address, 11 Allen Street, may be mapped to a concatenated string of tokens representing "address," "11," "eleven," "number," "street," "userID," "username," etc., which are all the tokens in the codebook associated with a particular user's address. Concatenating thus reduces the number of independent searches in this example by a factor of seven. As discussed, because homomorphic encryption requires multiple computations per comparison, reducing the number of HE comparisons provides a speedup that is superliner to the factor by which the number of comparisons are reduced (e.g., more than a seven-fold speed-up in the above comparison).

Concatenation may be performed based on known patterns of information, such as words, names, and numbers, that may be grouped together, such as how an address may group together a house number, street name, city name, state name, and zip code. Concatenation may reduce the amount of searches and comparisons in the homomorphic encryption domain by utilizing searching token signature rather than searching separately for each term or token. For example, a conventional query meant to search for a particular user by its name and phone number may be mapped to a single token signature for the user including a string of concatenated tokens representing all relevant token(s) in the codebook including name, phone number, address, and all other identifying information for the user. A single search may be performed for the queries' token signature rather than performing multiple conventional searches separately for the user's name and phone number.

Since the token strings are indecipherable in the encrypted domain, the tokens may be concatenate in the same order by both the query provider and the target data provider to ensure like objects are being compared. In one example, each token may have a rank, order or unique identifier (e.g., the order in which it is listed in the codebook) and may be concatenated in that order (e.g., in ascending or descending order). Additionally or alternatively, tokens may be concatenated in a logical or rules-based order. For example, tokens for an address may be concatenated to have the tokens for the house number, street name, city name, state name, and zip code in a specific order. Alternatively, the tokens for the query and target data may be concatenated in random or different orders, and the system may be configured to compare each encrypted permutation of tokens in the signatures for the query and target data to determine if there is a match.

Some embodiments of the invention may store each token signature generated from a data element in a metadata file associated with the data element. The metadata file may additionally include a frequency of each mapping to the token signature in the data element.

One application of embodiments of the invention is for a first data provider to search the data of a second semi-trusted data provider, while keeping the search query and results secret from the second data provider. In one example, the first data provider may be a law enforcement agency conducting a financial fraud investigation, where the investigation is not public, and so cannot reveal its query, e.g., the person targeted by the investigation to the second party, e.g., a bank holding the person's financial records. The second party is considered semi-trusted because it can perform the search, but cannot access the query or results without compromising the investigation. In such a situation, the second semi-trusted data provider may perform the search on a homomorphically encrypted query, and may return a homomorphically encrypted search comparison, without decrypting or exposing the query or search results.

In some embodiments, the first data provider (e.g., a query provider), may be configured to map a first data element comprising secret data (e.g., a secret query), to a first plurality of tokens using a codebook of tokens to represent data elements. The first data provider may be configured to concatenate the first plurality of tokens to generate a first token signature comprising the first plurality of tokens that uniquely represents the first data element. The first data provider may homomorphically encrypt the first token signature using a pubic homomorphic encryption key to generate a homomorphically encrypted first token signature representing a first data element, and may transmit the first token signature to a second data provider (e.g., a semi-trusted database or cloud/file management system storing target data being searched).

Similarly, the second data provider may be configured to map a second data element (e.g., the target data being searched) to a second plurality of tokens using the same token codebook, and concatenate the second plurality of tokens to generate a second token signature comprising the second plurality of tokens that uniquely represents the second data element.

The second data provider, or another device or party, may be configured to compare the homomorphically encrypted first token signature representing the first data element and an unencrypted or homomorphically encrypted second token signature to generate a homomorphically encrypted comparison of the first and second token signatures. At least the first data element is homomorphically encrypted, so its comparison with the second data element (in unencrypted plaintext or also homomorphically encrypted) is likewise homomorphically encrypted, and so cannot be decrypted by the second data provider, which is only semi-trusted and so does not have access to the secret homomorphic decryption key. The second data provider may be configured to transmit the homomorphically encrypted comparison to a trusted third party, which may be the first data provider, or to another external party or device, to decrypt the homomorphically encrypted comparison.

In some embodiments of the invention, the trusted third party receives the homomorphically encrypted comparison, and the third party decrypts the homomorphically encrypted comparison, using the private homomorphic decryption key. The decrypted comparison may indicate if the first and second token signatures match or not respectively indicating that the search query is found or not found in the target data. Additionally or alternatively, the decrypted comparison may include a matching score indicating a frequency or certainty with which the search query is found in the target data.

In some embodiments, the second data provider may also homomorphically encrypt the second token signature using a public homomorphic encryption key, e.g., when the second data element, such as the target data being searched, comprises secret data, or could be used to derive secret data, such as a hospital record or a bank record. In some embodiments of the invention, the public homomorphic encryption key used by the first and second data providers are the same. In some embodiments of the invention the public homomorphic encryption key used by the first and second data providers are different. In some embodiments, when two different encryption keys are used, the homomorphically encrypted comparison may be decrypted by two different corresponding decryption keys, e.g., both stored at one device, or each stored at a different decryption device both of which together decrypt the data. In some embodiments, the second public homomorphic encryption key may be a proxy re-encryption key, which may switch encryptions from a first encryption key to a second encryption key. In this case a single decryption key associated with the second key may decrypt the PRE HE comparison.

In some embodiments of the invention, the second data provider may not homomorphically encrypt the second token signature, e.g., when the second data element contains only publicly accessible information, such as data entries stored on a publicly accessible database, or the second data provider is trusted.

The private key for decrypting the homomorphically encrypted comparison may only be stored on or accessible to a trusted device or system, such as the first data provider, such as the query provider, or a trusted third party (and not by a semi-trusted device, such as the second data provider). Accordingly, only the trusted device can decrypt the homomorphically encrypted comparison and accessing the results to determine if the search query is found or not in the target data.

In some embodiments of the invention, the privacy of the search query may not need to be protected and, instead, only the privacy of the target data being searched needs to be protected. In such embodiments, the first data provider may be the target data provider, such as a data warehouse or cloud/file management system, providing the first data element as the target data being searched, and the second data provider may be the query provider providing the second data element as the search query.

In some embodiments of the invention, the first data provider may be both the query provider and owns the target data being search, which is stored at the second data provider, such a semi-trusted database, semi-trusted cloud service or a semi-trusted file system. In such embodiments, the first data provider may search for its own data that is stored remotely. The first data provider may request that the second data provider performs encrypted searches of the first data provider's target data, without accessing the first data provider's target data.

For example, a first data provider, such as a hospital or bank, may store a plurality of second data elements, such as such as medical records or bank records, in one or more memories of the second data provider. The first data provider may need the second data provider to perform a search for certain second data elements without the second data provider being able to access those second data elements or being able to derive that information. Therefore, in such an application, the second data elements is encrypted at the second data provider, and the decryption key may only be present on a trusted device or system, such as the first data provider. This protocol ensures that the data stored at the second data provider, such as semi-trusted database is encrypted and cannot be unlocked since the secret decryption key is not shared. This protocol also ensures that it is possible to search target data without disclosing the target data. In such an application, the first data element and the first token signature itself may not be encrypted, for example, when the search query itself does not contain sensitive information that needs to be protected. Alternatively, the first data element and token signature may be homomorphically encrypted, for example, when the search query does not contain sensitive information that needs to be protected.

In such embodiments, the first data provider may encrypt the second data element using any standard encryption, and, transmit the encrypted second data element to the second data provider for storage. Instead of the second data provider, the first data provider may map the second data element to a second plurality of tokens using the token codebook, concatenate the second plurality of tokens to generate the second token signature, homomorphically encrypt the second token signature using the public homomorphic encryption key to generate the homomorphically encrypted second token signature, and transmit the homomorphically encrypted second token signature to the second data provider to store with a correlation to the encrypted second data element.

Reference is made to FIG. 1 which is a schematic illustration of a multi-party system and workflow for providing a fast and secure targeted search in a semi-trusted environment using homomorphic encryption, according to an embodiment of the invention. The multi-party system of FIG. 1 comprises a trusted first homomorphic encryption (HE) data provider 140, a semi-trusted or untrusted second data provider 150, and a trusted third party 125 (e.g., to homomorphically decrypt the search results).

In scenario (1), shown in FIG. 1, both data providers 140 and 150 homomorphically encrypt their data. In scenarios (2) and (3), only the first data provider 140 homomorphically encrypts its first data element, while the second data provider 150 leaves its second data element unencrypted in plaintext. In scenario (2), the first data provider 140 is the query provider (generating a HE query) and the second data provider 150 is the target data provider (generating unencrypted target data). In scenario (3), the first data provider 140 is the target data provider (generating HE target data) and the second data provider 150 is the query data provider (generating an unencrypted query).

The second data provider 150 may store at least one second data element 111, such as target data being searched. The first data provider 140, which may be, for example, a trusted query provider requesting that the second data provider 150 determine if any of the at least one second data element 111 matches the first data element 101 without exposing the first data element 101 to the second data provider 150. In some embodiments of the invention, the first data provider 140 may be, for example, a trusted query provider storing first data element 101, such as a search query, and the second data provider 150 may be, for example, a semi-trusted database or cloud/file management system storing second data element 111, such as target data being searched, or vice versa.

The first data provider 140 may map the first data element 101 to a first plurality of tokens 103 using a codebook of tokens to represent first data element 101. The first data provider 140 may concatenate the first plurality of tokens to generate a first token signature 105 comprising the first plurality of tokens that uniquely represents the first data element 101. The first data provider 140 may homomorphically encrypt the first token signature 107 and transmit the homomorphically encrypted first token signature 107 to a device for comparison (e.g., the second data provider 150 or another external device or party).

The second data provider 150 may map the second data element 111 to at least one second plurality of tokens 113 using the token codebook. The second data provider 150 may concatenate the at least one second plurality of tokens to generate at least one second token signature 115. In scenario (1), e.g., when the second data element 111 contains secret data, the second data provider 150 may be configured to homomorphically encrypt the second token signature 115 using a public homomorphic encryption key to generate a homomorphically encrypted second token signature 117 representing the second data element. The public homomorphic encryption key used by the first data provider 140 and second data provider 150 may be the same or different. In scenarios (2) and (3), e.g., when the second data element 111 does not contain secret data, homomorphic encryption may be skipped, and the second token signature 115 may be left unencrypted. When an external device performs the search comparison (e.g., trusted party 125), the second data provider 150 may transmit the unencrypted or homomorphically encrypted second token signature 117 to the external device or party. Otherwise, the second data provider 150 may keep and store the unencrypted or homomorphically encrypted second token signature 117 in memory.

The second data provider 150 or an external device (e.g., trusted party 125) may be configured to perform a homomorphic search by comparing the homomorphically encrypted first token signature 107 representing the first data element 101 to each of at least one unencrypted or homomorphically encrypted second token signatures 117 representing the second data element 111 to generate at least one homomorphically encrypted comparison 119 of the first and second token signatures. Examples of computations for generating the homomorphically encrypted comparison 119 are defined in equations (1)-(3). The homomorphically encrypted comparison 119 may be transmitted to (or remain in) a trusted device for decryption and analysis.

The trusted device, e.g., the first data provider 140 or trusted party 125, may decrypt the homomorphically encrypted comparison 119, using a private homomorphic decryption key, to generate an unencrypted comparison 121. The unencrypted comparison 121 may indicate whether or not the first and second token signatures match respectively indicating that the search query is found or not in the target data. The unencrypted comparison 121 may additionally or alternatively indicate a matching score defining a frequency or certainty with which the search query is found in the target data.

Data structures 101-121, although shown to be performed by particular devices in FIG. 1, may be performed by any one or more individual or combinations of first data provider(s) 140, second data provider(s) 150 and trusted part(ies) 125, or other external devices or third party systems.

Figure 2:
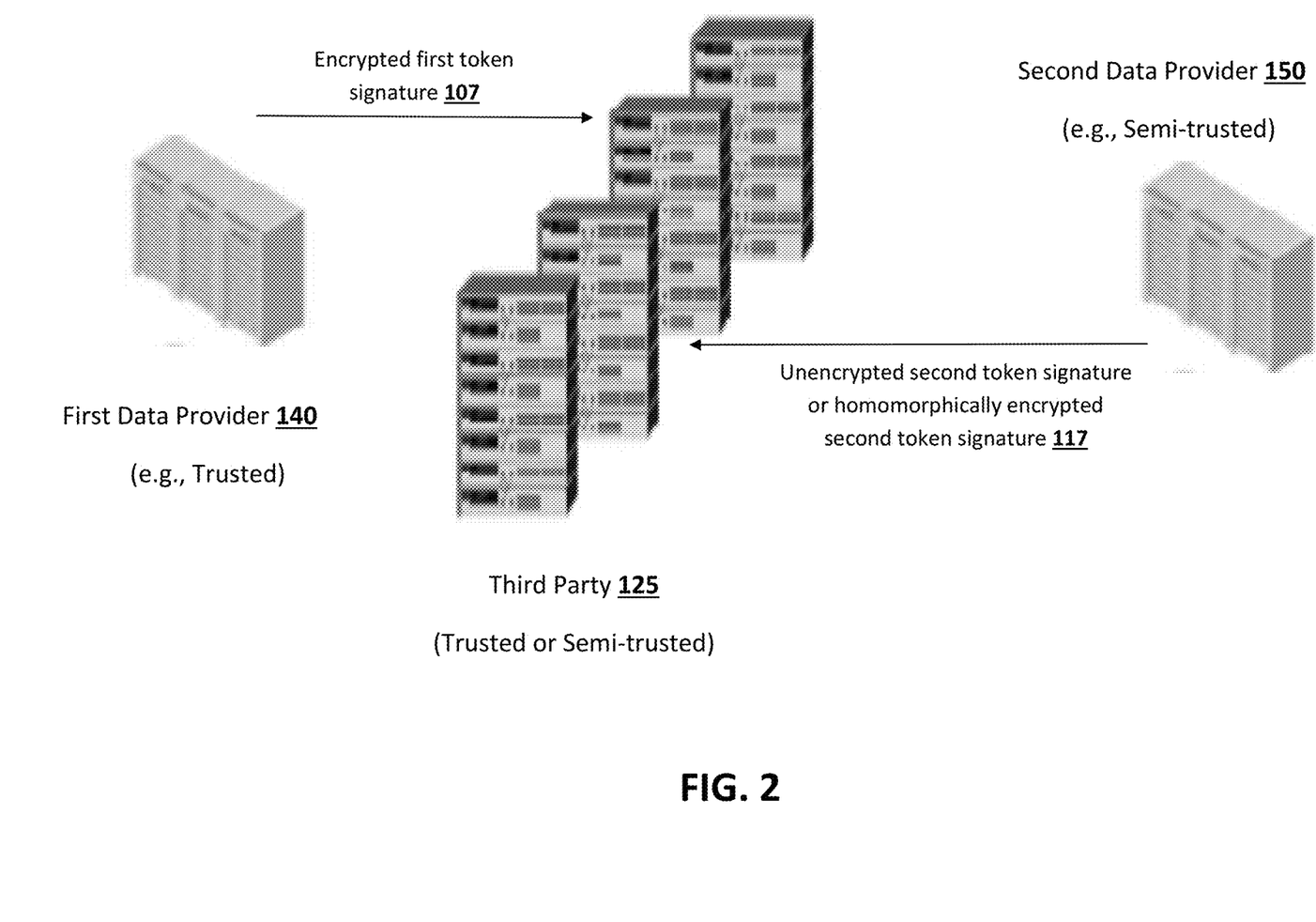
FIG. 2 is a schematic illustration of a multi-party system comprising a trusted first homomorphic encryption (HE) data provider (e.g., of a HE search query), a semi-trusted or untrusted second data provider (e.g., of HE or unencrypted target data to be searched), and a trusted third party (e.g., to homomorphically decrypt the search results), according to an embodiment of the invention.

Reference is made to FIG. 2, which schematically illustrates a multi-party system comprising a trusted first homomorphic encryption (HE) data provider 140 (e.g., of a HE search query), a semi-trusted or untrusted second data provider 150 (e.g., of HE or unencrypted target data to be searched), and a trusted third party 125 (e.g., to homomorphically decrypt the search results), according to an embodiment of the invention. In various embodiments, the third party 125 may be the first data provider 140, the second data provider 150, or a distinct external system or party.

The first data provider may be, for example, a query provider which includes one or more memories and one or more processors. The one or more memories of the first data provider may be configured to store a first data element comprising secret data, a codebook of tokens to represent data elements, and a first public homomorphic encryption key. The first data provider may be configured to map the first data element to a plurality of tokens using the token codebook, concatenate the plurality of tokens to generate a first token signature comprising the plurality of tokens that uniquely represent the first data element, and homomorphically encrypt the first token signature by utilizing the first public homomorphic encryption key to generate a homomorphically encrypted first token signature representing the first data element.

The second data provider may be, for example, a database or cloud/file management system which includes one or more memories and one or more processors. The one or more memories of the second data provider may be configured to store a second data element comprising secret or public data, and the same codebook of tokens as the first data provider. In some embodiments of the invention, the one or more memories of the second data provider also store a second public homomorphic encryption key, which may be the same or different key as the first public homomorphic encryption key. The second data provider may be configured to map the second data element to a plurality of tokens using the token codebook, and concatenate the plurality of tokens to generate a second token signature comprising the plurality of tokens that uniquely represent the second data element. The second data provider may be configured to transmit the second token signature to the trusted third party 125, or may be configured to homomorphically encrypt the second token signature by utilizing the second public homomorphic encryption key to generate a homomorphically encrypted second token signature representing the first data element and transmit the homomorphically encrypted second token signature to the trusted third party 125.

The trusted third party 125 may be a computation host configured as one or more centralized server(s) or part(ies), which may offer services, such as performing search and retrieval of secure or encrypted data, to a variety of users, such as the first data provider and the second data provider. In scenarios where the second data provider is untrusted and should not perform the comparison between the homomorphically encrypted first token signature and the unencrypted or homomorphically encrypted second token signature, the first data provider and the second data provider may transmit the homomorphically encrypted first and second token signatures to the trusted or semi-trusted third party 125 to perform the comparison.

The third party may be configured to compare the homomorphically encrypted first token signature representing the first data element and the unencrypted or homomorphically encrypted second token signature to generate a homomorphically encrypted comparison of the first and second token signatures. If the third party is trusted, the third party may be configured to decrypt the homomorphically encrypted comparison, using a private homomorphic decryption key, to determine if the first and second token signatures match or not respectively indicating that the search query is found or not in the target data. If the second token signature utilized for the comparison was not homomorphically encrypted or the second public homomorphic encryption key is the same as the first public homomorphic encryption key such that the private homomorphic decryption key also corresponds to the second public homomorphic encryption key, then the third party may be configured to decrypt the homomorphically encrypted comparison utilizing the private homomorphic decryption key. If the second token signature utilized for the comparison was homomorphically encrypted utilizing the second public homomorphic encryption key, and the second public homomorphic encryption key is not the same as the first public homomorphic encryption key, then the third party may be configured to decrypt the homomorphically encrypted comparison utilizing a first and second private homomorphic decryption key (alone or in combination with another device possessing the second private key). If the third party is not trusted, but semi-trusted, the third party may transmit the homomorphically encrypted comparison to a trusted device, such as, the first data provider to decrypt.

If the second data provider is semi-trusted and the third party is trusted, the first data provider may be configured to transmit the homomorphically encrypted first token signature to the second data provider to compare to the unencrypted or homomorphically encrypted second token signature, and may transmit the homomorphically encrypted comparison to the third party to decrypt.

The first data provider may be the query provider and the second data provider may be the target data provider, or vice versa. The first and second data providers 140 and 150 and trusted party 125 in FIG. 2 may be the same of different as those in FIG. 1.

Figure 3:
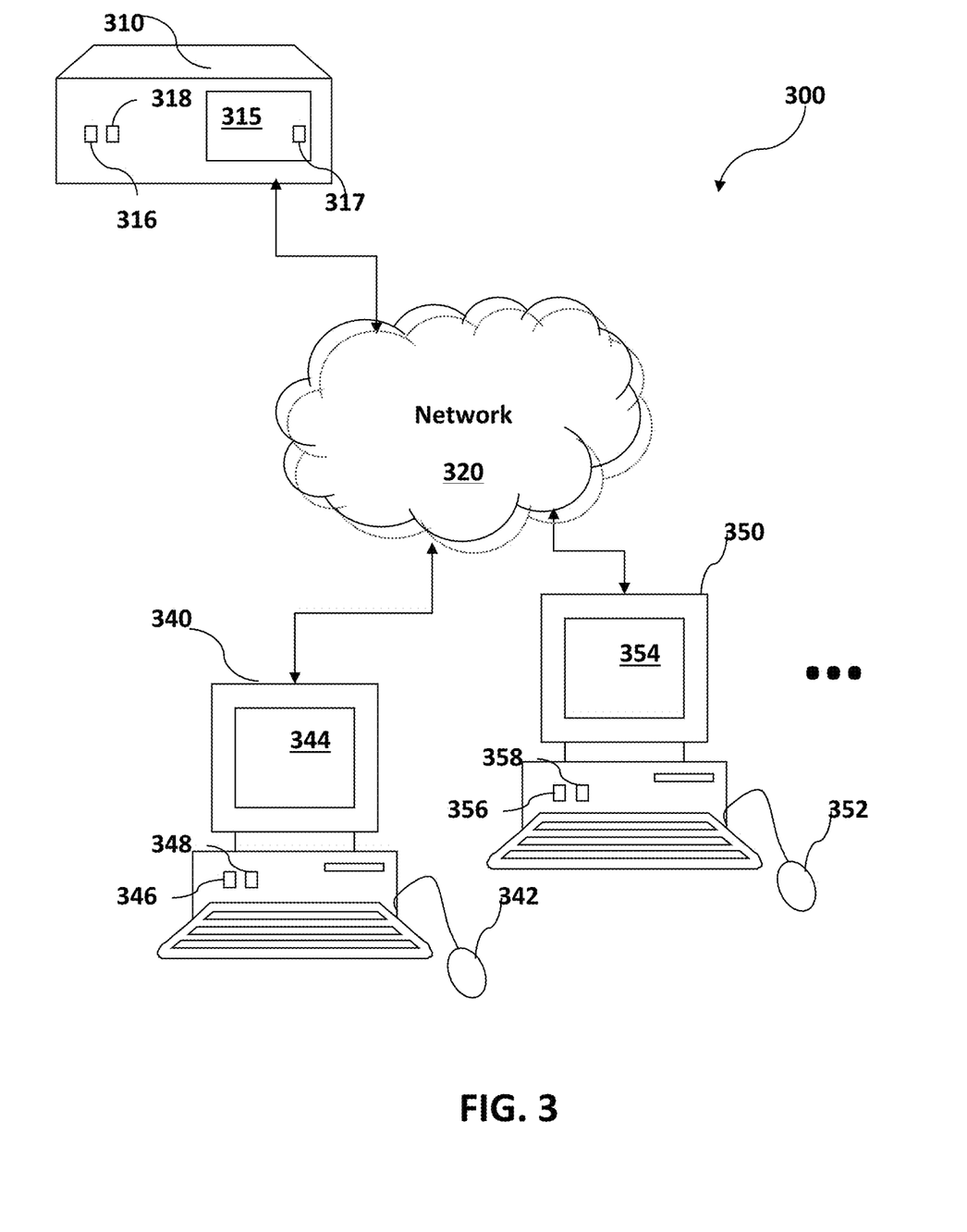
FIG. 3 is a schematic illustration of a multi-party system for securely searching data in a semi-trusted environment, according to an embodiment of the invention.

Reference is made to FIG. 3, which schematically illustrates a multi-party system 300 for securely searching data in a semi-trusted environment according to an embodiment of the invention. The systems described in reference to FIGS. 1 and 2 may include devices and/or components of system 300 of FIG. 3. The devices of system 300 may be operated by one of the parties disclosed herein including, for example, a query provider, a target data provider such as a database or cloud/file management system that stores the data to be searched, and/or one or more third parties, such as a trusted server.

Multi-party system 300 comprises one or more first computer(s) 340 (e.g., operated by first data provider(s) 140 of FIGS. 1 and 2), one or more second computer(s) 350 (e.g., operated by second data provider(s) 150 of FIGS. 1 and 2), and one or more third party server(s) 310 (e.g., operated by third part(ies) 125 of FIGS. 1 and 2). In one example, the first computer 340 may be operated by a query provider and the second computer 350 may be operated by a database or cloud/file management system that stores the target data being searched. Other parties may also operate these devices in accordance with other embodiments of the invention. Computer(s) 340 and 350 and third party server(s) 310 may be connected via one or more wired or wireless communication networks 320 (e.g., network 120 of FIG. 1).

The first data provider computer 340 may store, in memory unit 358, a first data element (e.g., 101 of FIG. 1) comprising secret data, a codebook of tokens representing data elements, and a first public homomorphic encryption key. The first data provider computer 340 may use the codebook to map the first data element to at least one first token signature (e.g., 105 of FIG. 1). The first data provider computer 340 may use the first public homomorphic encryption key to encrypt the first token signature to generate a homomorphically encrypted first token signature (e.g., 107 of FIG. 1) representing the first data element. The first data provider computer 340 may transmit the homomorphically encrypted first token signature to a search device, such as second data provider computer 350 or third party computation host server(s) 310.

The second data provider computer 350 may store, in memory unit 348, a second data element (e.g., 111 of FIG. 1) comprising either secret or non-secret data and the same token codebook as stored on the first data provider computer 350. In some embodiments of the invention, e.g., where the second data element comprises secret data, the second data provider computer 350 may store a public homomorphic encryption key that is the same as or different than the first public homomorphic encryption key. The second data provider computer 350 may use the codebook to map the second data element to at least one second token signature (e.g., 115 of FIG. 1). The second data provider computer 350 may leave the second token signature unencrypted or use its public homomorphic encryption key to encrypt the second token signature to generate a homomorphically encrypted second token signature (e.g., 117 of FIG. 1) representing the second data element. The second data provider computer 350 may compare locally or transmit the second token signature to an external comparison device, such as third party computation host server(s) 310.

Second data provider computer 350 or third party computation host server(s) 310 may host computations or tests, such as comparing the homomorphically encrypted first token signature representing the first data element and an unencrypted or homomorphically encrypted second token signature, e.g., according to EQNs. (1)-(3), to generate a homomorphically encrypted comparison (e.g., 119 of FIG. 1) of the first and second token signature. In embodiments of the invention where the second data provider computer 350 is configured to perform the comparison, the second data provider computer 340 may transmit it to an external trusted decryption device, such as first data provider computer 340 or third party computation host server(s) 310. In embodiments of the invention where the third party computation host server(s) 310 is configured to perform the comparison, the third party computation host server(s) 310 may keep the HE comparison locally or transmit it to an external trusted decryption device, such as first data provider computer 340 or another third party device.

The third party computation host server(s) 310, the first data provider computer 340, or another trusted external device, may store a private homomorphic decryption key for decrypting the homomorphically encrypted comparison to generate an unencrypted comparison of the first and second token signatures (e.g., 121 of FIG. 1). In embodiments where only the first, but not second, token signatures is encrypted, or both token signatures are encrypted using the same key, decryption may be executed with a single corresponding private homomorphic decryption key. In embodiments where the first and second token signatures are both encrypted using two different respective encryption keys, two separate corresponding private homomorphic decryption keys may be used to decrypt by one or more of the third party computation host server(s) 310, the first data provider computer 340, and/or another trusted external device.

Third party computation host server(s) 310 may include a separate secure memory 315 secret data 317. Secret data 317 may include the first and/or second private homomorphic decryption key(s) and/or the unencrypted comparison (e.g., 121 of FIG. 1). Secure memory 315 may be internal or external to one or more of the third party computation host server(s) 310 and may be connected thereto by a local or remote and a wired or wireless connection. In alternate embodiments, data 317 may be stored in an alternate location separate from database 315, e.g., memory unit(s) 318.

Data provider computers 340 and 350 and third party computation host server(s) 310 may be servers, personal computers, desktop computers, mobile computers, laptop computers, and notebook computers or any other suitable device such as a cellular telephone, personal digital assistant (PDA), video game console, etc., and may include wired or wireless connections or modems to connect to network 320. Data provider computers 340 and 350 may include one or more input devices 342 and 352, respectively, for receiving input from a user (e.g., via a pointing device, click-wheel or mouse, keys, touch screen, recorder/microphone, other input components). Data provider computers 340 and 350 may include one or more output devices 344 and 354 (e.g., a monitor or screen) for displaying data to a user provided by or for computation host server(s) 310.

Network 320, which connects third party computation host server(s) 310 and data provider computers 340 and 350, may be any public or private network such as the Internet. Access to network 320 may be through wire line, terrestrial wireless, satellite or other systems well known in the art.

Third party computation host server(s) 310 and data provider computers 340 and 350, may include one or more controller(s) or processor(s) 316, 346, and 356, respectively, for executing operations according to embodiments of the invention and one or more memory unit(s) 315/318, 348, and 358, respectively, for storing data (e.g., data elements, token signatures, homomorphic encryption keys and decryption keys, encrypted token signatures, and homomorphically encrypted and decrypted comparisons) and/or instructions (e.g., software for mapping data elements to plurality of tokens, concatenating plurality of tokens into token signatures, applying test computations or calculations, keys to encrypt, decrypt or re-encrypt data according to embodiments of the invention) executable by the processor(s). Processor(s) 316, 346, and/or 356 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 318, 348, and/or 358 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units. Secure memory 315 may be memory that is specialized memory physically separate from general memor(ies) that validates prescribed security configurations, such as the Intel™ SGX product. Secure memory 315 may allow computation on a "TPM—Trusted Program Module."

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Figure 4:
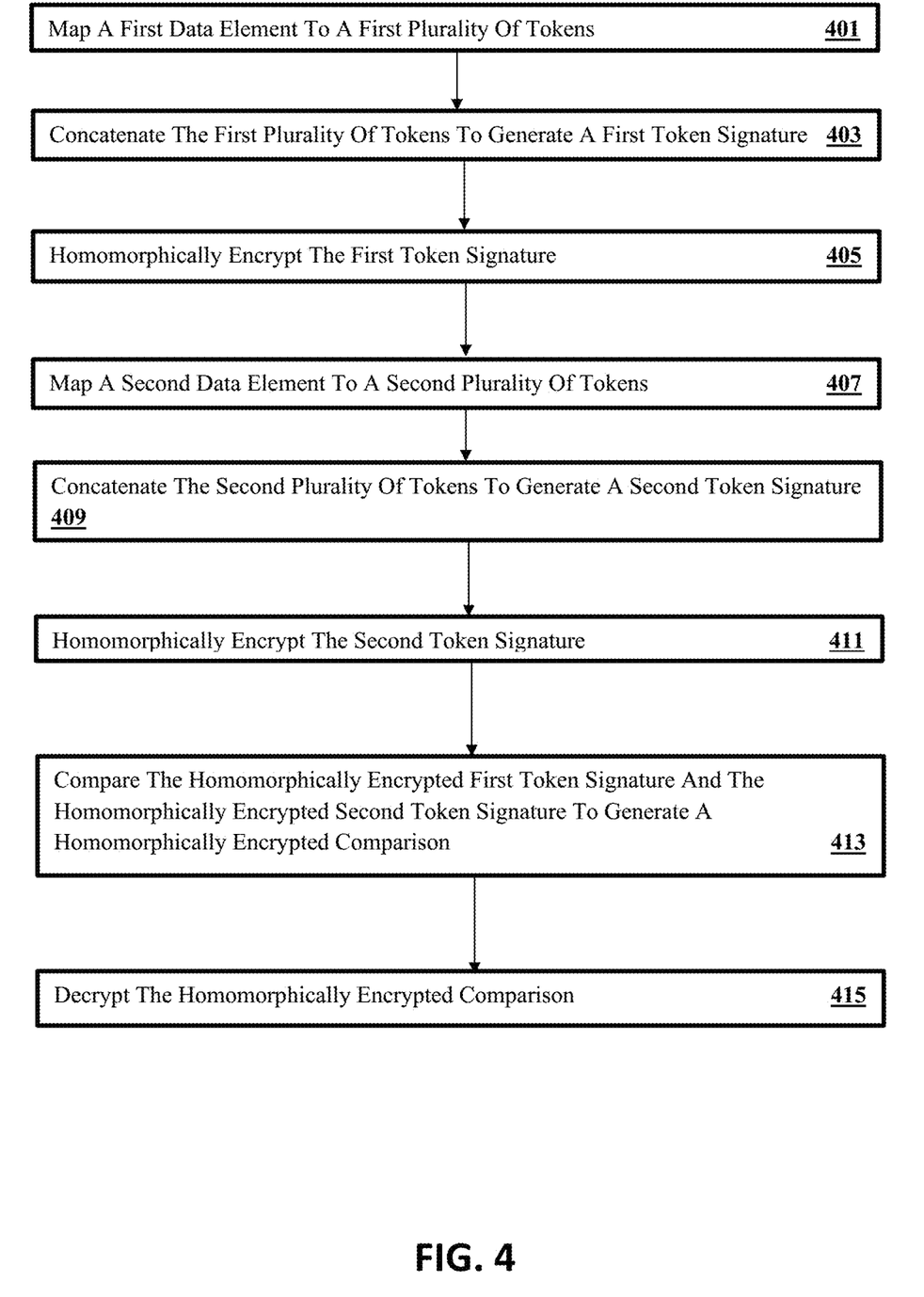
FIG. 4 is a flowchart of a method for securely searching data in a semi-trusted environment, according to an embodiment of the invention.

Reference is made to FIG. 4, which is flowchart of a method for securely searching data in a semi-trusted environment, according to an embodiment of the invention. Operations of FIG. 4 may be performed using the devices, architectures, data structures, and/or workflows described in reference to FIGS. 1-3. Other devices and configurations may also be used.

In operation 401, a first data provider (e.g., 140 of FIGS. 1 and 2 or 340 of FIG. 3) may map a first data element (e.g., 101 of FIG. 1) comprising secret data to a first plurality of tokens (e.g., 103 of FIG. 1) using a codebook of tokens to represent data elements.

In operation 403, the first data provider may concatenate the first plurality of tokens to generate a first token signature (e.g., 105 of FIG. 1) comprising the first plurality of tokens that uniquely represents the first data element.

In operation 405, the first data provider may homomorphically encrypt the first token signature using a first public homomorphic encryption key to generate a homomorphically encrypted first token signature (e.g., 107 of FIG. 1) representing the first data element.

The first data provider may be configured to transmit the homomorphically encrypted first token signature to a second data provider (e.g., 150 of FIGS. 1 and 2 or 350 of FIG. 3) or a third party (e.g., the trusted party 125 of FIGS. 1 and 2 or 310 of FIG. 3) for comparison.

In operation 407, the second data provider may map a second data element (e.g., 111 of FIG. 1) to a second plurality of tokens (e.g., 113 of FIG. 1) using the token codebook. One of the first and second data elements (e.g., 101 or 111 of FIG. 1) may be a search query and the other (e.g., 111 or 101 of FIG. 1, respectively) may be target data to be searched.

In operation 409, the second data provider may concatenate the second plurality of tokens to generate a second token signature (e.g., 115 of FIG. 1).

In operations, If the second data element includes secret data, in operation 411 the second data provider may homomorphically encrypt the second token signature using a second public homomorphic encryption key to generate a homomorphically encrypted second token signature (e.g., 117 of FIG. 1) representing the second data element. In embodiments of the invention where the second data element does not contain secret data, operation 411 may be skipped, and the second token signature may be left unencrypted.

In embodiments of the invention where the third party is configured to generate the homomorphically encrypted comparison, the second data provider may be configured to transmit the homomorphically encrypted or unencrypted second token signature to the third party.

In operation 413, the second data provider or third party may compare the homomorphically encrypted first token signature representing the first data element and the unencrypted or homomorphically encrypted second token signature to generate a homomorphically encrypted comparison (e.g., 119 of FIG. 1) of the first and second token signatures. The second data provider or third party may transmit the homomorphically encrypted comparison to the first data provider or the third party. In some embodiments of the invention, in operation 413, the third party may compare and decrypt, this transmission may be omitted.

In operation 415, the trusted first data provider or third party may decrypt the homomorphically encrypted comparison, utilizing a private homomorphic decryption key, to expose the unencrypted comparison (e.g., 121 of FIG. 1). The unencrypted comparison may be a binary indication of whether or not the first and second token signatures match respectively indicating that the search query is found or not in the target data, and/or a matching score (e.g., a continuous value or value in a range of three or more numbers) indicating a frequency or certainty with which the search query is found in the target data. In some embodiments of the invention, when the first and second token signatures are encrypted with two different decryption keys, in operation 415, the trusted first data provider and/or third party may decrypt the homomorphically encrypted comparison utilizing both decryption keys.

In the foregoing description, various aspects of the present invention are described. For purposes of explanation, specific configurations and details are set forth in order to provide a thorough understanding of the present invention. However, it will also be apparent to one of ordinary skill in the art that the present invention may be practiced without the specific details presented herein. Furthermore, well known features may be omitted or simplified in order not to obscure the present invention.

Unless specifically stated otherwise, as apparent from the foregoing discussion, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

It should be recognized that embodiments of the present invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for securely searching data in a semi-trusted environment, the system comprising:
   a first data provider comprising one or more first processors configured to:
      map a first data element comprising secret data to a first plurality of tokens by searching a codebook storing unencrypted tokens and associated mappings to represent data elements, wherein searching the codebook associates the first plurality of tokens that match the same or substantially similar information as the first data element;
      concatenate the first plurality of tokens to generate a first token signature comprising the first plurality of tokens that uniquely represents the first data element, and
      homomorphically encrypt the first token signature using a public homomorphic encryption key to generate a homomorphically encrypted first token signature representing the first data element;
   a second data provider comprising one or more second processors configured to:
      map a second data element to a second plurality of tokens by searching the token codebook, wherein searching the codebook associates the second plurality of tokens that match the same or substantially similar information as the second data element, and wherein one of the first and second data elements is a search query and the other is target data being searched, concatenate the second plurality of tokens to generate a second token signature comprising the second plurality of tokens that uniquely represent the second data element, and compare the homomorphically encrypted first token signature representing the first data element and an unencrypted or homomorphically encrypted second token signature to generate a homomorphically encrypted comparison of the first and second token signatures;

and a trusted party comprising one or more processors configured to:

decrypt the homomorphically encrypted comparison, using a private homomorphic decryption key, to determine that the first and second token signatures match or not respectively indicating that the search query is found or not in the target data.

2. The system of claim 1, wherein the first data element is the search query and the second data element is the target data to be searched, or the second data element is the search query and the first data element is the target data to be searched.

3. The system of claim 1, wherein the first data provider operates in a trusted environment, the second data provider operates in a trusted or semi-trusted environment, and the trusted party operates in a trusted environment.

4. The system of claim 1, wherein the trusted party is the first data provider, the second data provider, or a distinct third party system.

5. The system of claim 1, wherein the one or more first and second processors of the first and second data providers are configured to map the first and second data elements, respectively, to a plurality of tokens, comprising for each data element:

divide the data element into one or more atomic data units, search the codebook for a plurality of tokens matching each instance of each atomic data unit, and generate an ordered set of the plurality of tokens for the plurality of atomic units.

6. The system of claim 1, wherein the codebook of tokens is dynamically updated by adding new tokens to the codebook and deleting preexisting tokens from the codebook, wherein the updated codebook is simultaneously available to both the first and second data providers.

7. The system of claim 1, wherein the comparison of the first and second token signatures is a binary indication of whether or not the search query is found in the target data.

8. The system of claim 1, wherein the comparison of the first and second token signatures is a matching score indicating a frequency or certainty with which the search query is found in the target data.

9. A first data provider for securely searching data in a semi-trusted environment, the first data provider comprising:

one or more memories configured to store a first data element comprising secret data, a codebook of unencrypted tokens and associated mappings to represent data elements, and a public homomorphic encryption key;

and one or more processors configured to:

map the first data element comprising secret data to a first plurality of tokens by searching the token codebook, wherein searching the token codebook associates the first plurality of tokens that match the same or substantially similar information as the first data element;

concatenate the first plurality of tokens to generate a first token signature comprising the first plurality of tokens that uniquely represents the first data element;

homomorphically encrypt the first token signature using the public homomorphic encryption key to generate a homomorphically encrypted first token signature representing the first data element;

transmit the homomorphically encrypted first token signature to a second data provider to compare the homomorphically encrypted first token signature representing the first data element and an unencrypted or homomorphically encrypted second token signature representing a second data element and generate a homomorphically encrypted comparison of the first and second token signatures, wherein one of the first and second data elements is a search query and the other is target data being searched; and receive the result of decrypting the homomorphically encrypted comparison at a trusted device, using a private homomorphic decryption key, to determine that the first and second token signatures match or not respectively indicating that the search query is found or not in the target data.

10. The first data provider of claim 9, wherein the first data provider operates in a trusted environment, the second data provider operates in a trusted or semi-trusted environment, and the trusted device operates in a trusted environment.

11. A second data provider for securely searching data in a semi-trusted environment, the second data provider comprising:

one or more memories configured to store a second data element, and a codebook of unencrypted tokens and associated mappings to represent data elements; and one or more processors configured to:

map the second data element to a second plurality of tokens by searching the token codebook, wherein searching the codebook associates the second plurality of tokens that match the same or substantially similar information as the second data element, concatenate the second plurality of tokens to generate a second token signature comprising the second plurality of tokens that uniquely represent the second data element, receive, from a first data provider, a homomorphically encrypted first token signature that is a homomorphically encryption of a concatenation of a first plurality of tokens uniquely representing a first data element comprising secret data according to the codebook of tokens, wherein one of the first and second data elements is a search query and the other is target data being searched, compare the homomorphically encrypted first token signature representing the first data element and an unencrypted or homomorphically encrypted second token signature to generate a homomorphically encrypted comparison of the first and second token signatures, and transmit the homomorphically encrypted comparison to a trusted device to decrypt the homomorphically encrypted comparison, using a private homomorphic decryption key, to determine that the first and second token signatures match or not respectively indicating that the search query is found or not in the target data.

12. The second data provider of claim 11, wherein the one or more memories are further configured to store the public homomorphic encryption key to generate the homomorphically encrypted second token signature.

13. The second data provider of claim 11, wherein the first data provider operates in a trusted environment, the second data provider operates in a trusted or semi-trusted environment, and the trusted device operates in a trusted environment.

14. A method for securely searching data in a semi-trusted environment, the method comprising, at a first data provider:
  mapping a first data element comprising secret data to a first plurality of tokens by searching a codebook storing unencrypted tokens and associated mappings to represent data elements, wherein searching the codebook associates the first plurality of tokens that match the same or substantially similar information as the first data element;
  concatenating the first plurality of tokens to generate a first token signature comprising the first plurality of tokens that uniquely represents the first data element;
  homomorphically encrypting the first token signature using a public homomorphic encryption key to generate a homomorphically encrypted first token signature representing the first data element;
  transmitting the homomorphically encrypted first token signature to a second data provider to compare the homomorphically encrypted first token signature representing the first data element and an unencrypted or homomorphically encrypted second token signature representing a second data element and generate a homomorphically encrypted comparison of the first and second token signatures, wherein one of the first and second data elements is a search query and the other is target data being searched;
  receiving the result of decrypting the homomorphically encrypted comparison at a trusted device,
  using a private homomorphic decryption key, to determine that the first and second token signatures match or not respectively indicating that the search query is found or not in the target data.

15. The method of claim 14, wherein the first data element is the search query and the second data element is the target data to be searched, or the second data element is the search query and the first data element is the target data to be searched.

16. The method of claim 14, wherein the first data provider operates in a trusted environment, and the second data provider operates in a trusted or semi-trusted environment.

17. The method of claim 14, wherein mapping the first element to the first plurality of tokens comprises: dividing the data element into one or more atomic data units; searching the codebook for a plurality of tokens matching each instance of each atomic data unit; and generating an ordered set of the plurality of tokens for the plurality of atomic units.

18. The method of claim 14, further comprising dynamically updating the codebook of tokens by adding new tokens to the codebook and deleting preexisting tokens from the codebook, wherein the updated codebook is simultaneously available to both the first and second data providers.

19. The method of claim 14, wherein the comparison of the first and second token signatures is a binary indication of whether or not the search query is found in the target data.

20. The method of claim 14, wherein the comparison of the first and second token signatures is a matching score indicating a frequency or certainty with which the search query is found in the target data.

* * * * *